United States Patent
Thode

[11] 3,969,659
[45] July 13, 1976

[54] ALTERNATING CURRENT MOTOR SYSTEM
[75] Inventor: Herbert W. Thode, Oradell, N.J.
[73] Assignee: General Dynamics Corporation, St. Louis, Mo.
[22] Filed: Dec. 16, 1974
[21] Appl. No.: 533,044

[52] U.S. Cl. .............................. 318/237; 318/240
[51] Int. Cl.² ........................................ H02P 7/62
[58] Field of Search ............... 318/237, 239–241

[56] References Cited
UNITED STATES PATENTS

| | | | |
|---|---|---|---|
| 2,924,765 | 2/1960 | Lee | 318/237 |
| 3,227,937 | 1/1966 | Koppelmann et al. | 318/237 |
| 3,657,622 | 4/1972 | Reuland et al. | 318/237 |

Primary Examiner—Gene Z. Robinson
Attorney, Agent, or Firm—Martin Lu Kacher

[57] ABSTRACT

A system including an alternating current electric motor of the wound rotor type wherein the speed of the motor is controlled and its starting current is limited, is disclosed. A plurality of phase regulated SCR devices control the amount of resistance in the rotor winding circuits. A control voltage representing the difference between a desired motor speed and the actual motor shaft speed is supplied to an analog to digital converter which produces a multi-bit digital signal which controls the SCR devices so as to control rotor current in incremental steps. A vernier control signal is obtained by converting the digital signals back into analog form and comparing the control signal with the converted analog signal through the use of a difference amplifier circuit in a vernier amplifier. During start up, when the motor is brought up to speed and until the motor speed is close to the predetermined speed, the digital signal from the analog to digital converter is inhibited causing the SCR-resistor current paths in the rotor winding circuits to become open circuited. Another SCR-resistor vernier path which is connected to the rotor windings is operated by the vernier control signal to control the rotor current so as to provide for smooth low current starts as well as to control current in the rotor windings between the digitally controlled incremental steps.

28 Claims, 8 Drawing Figures

ALTERNATING CURRENT MOTOR SYSTEM

The present invention relates to alternating current motor systems and particularly to systems for regulating or controlling the speed of alternating current motors having wound rotors and limiting the current drawn by such motors during their start-up modes or when their speed drops significantly below their desired operating speed.

The invention is especially suitable for use in systems containing large or high power wound rotor electric motors. Such systems may include motor generator sets wherein regulation of speed and low current starts are especially desirable, as in shipboard applications. Aspects of the invention will however be found generally useful wherever the regulation of speed or the control of starting mode currents in wound rotor alternating current motors is desired. The motors to which the invention is applicable include polyphase wound rotor motor systems, such as conventional three phase wound rotor induction motors.

Wound rotor motor systems have been suggested wherein the speed of the motors have been controlled by controlling the current through the rotor winding as through the use of resistors which are switched into or out of circuit with the winding. Such switching and the effective value of the rotor winding resistance may be controlled by switches or phase regulated silicon controlled rectifiers (SCR's). The use of the term SCR is intended to include various solid state switches having similar operational characteristics. Reference may be had to U.S. Pat. Nos. 3,166,702 and 3,529,224, for examples of speed control arrangements for wound rotor motors using switched resistors and phase controlled SCR's respectively. Such switch control whether through the use of switches or phase controlled SCR's varying the secondary resistance of a wound rotor motor, produces current pulsations at the slip frequencies. By slip frequencies is meant the difference in speed of rotation of the rotating field of the motor and the speed of rotation of the rotor thereof. The frequency of these pulses thus may be from 2 to 20 Hertz (Hz) and can result in significant low frequency power pulses approaching frequencies at which the power generating system which provides power for driving the motor is mechanically or electrically resonant. These pulses thus can give rise to vibrations of a destructive character which are particularly difficult to counteract in shipboard or other mobile applications.

Another problem which is particularly pronounced in the case of large motors, say 100 horsepower and up, is high starting current which may be beyond the capacity of the power plant to produce and may cause improper operation of associated electrical apparatus, let along the blowing of fuses and the opening of breakers. The special starting switches, current regulators and the like, which are complex and may be expensive and unreliable have conventionally been used to limit the high inrush current when a large motor is initially started. A similar problem exists when the motor speed drops, say due to excessive loading or power plant supply voltage reductions. The current drawn by the motor then oftentimes increases and may cause damage to the motor itself as well as other adverse effects which can accompany high current drain conditions.

It is therefore an object of the present invention to provide an improved system including a wound rotor alternating current motor in which the foregoing problems, difficulties and disadvantages may be substantially eliminated.

It is a further object of the present invention to provide an improved system including a wound rotor alternating current motor wherein motor speed and starting current may be regulated through the use of the same apparatus.

It is a still further object of the present invention to provide an improved speed control system for a wound rotor alternating current motor which also is operative to limit current drawn by the motor during start up.

It is a still further object of the present invention to provide an improved speed control system for a wound rotor motor in which motor speed is smoothly controlled notwithstanding that rotor current is also varied in incremental steps.

It is a still further object of the present invention to provide an improved motor speed control system which digitally controls the speed of a wound rotor alternating current motor while providing smooth stepless speed control.

It is a still further object of the present invention to provide an improved motor speed control system for wound rotor electric motors by means of which current during the motor starting cycle is limited and allowed to slowly increase so as to bring the motor up to speed.

It is a still further object of the present invention to provide an improved speed control system for a wound rotor motor having a vernier control which provides precise stepless speed regulation to maintain constant motor speed and also serves to prevent current surges during starting and to bring the motor smoothly up to speed.

Briefly described, a speed regulated motor system embodying the invention includes a wound rotor induction motor. Means responsive to the speed of rotation of the motor provides a first control signal which is responsive to the deviation of motor speed from the desired speed. A control signal generator responds to this speed signal and generates second and third control signals; the second control signal corresponding to relatively large speed changes and the third signal representing relatively small or vernier changes in speed. The second control signal may be a digital signal while the vernier control signal is an analog signal. When however the speed of the motor drops below the control range of the second signal as occurs during the start-up cycle of the motor, the vernier signal continues to be generated while the control signal generator causes the second control signal to be inhibited. The current through the rotor winding is controlled separately by the second control signal and by the vernier control signal, as by such signals operating SCR-resistor circuits connected to the windings. Thus, during the start up and low speed modes of operation the vernier signal controls the rotor current so as to provide smooth low current starts; while during operation of the motor about the desired speed, both the first control signal and the vernier signal provide for current control such that the speed of the motor is regulated in a smooth and stepless manner.

The foregoing and other features, objects and advantages of the invention will become more readily apparent from a reading of the following description when taken in connection with the accompanying drawings in which.

Figure 1:
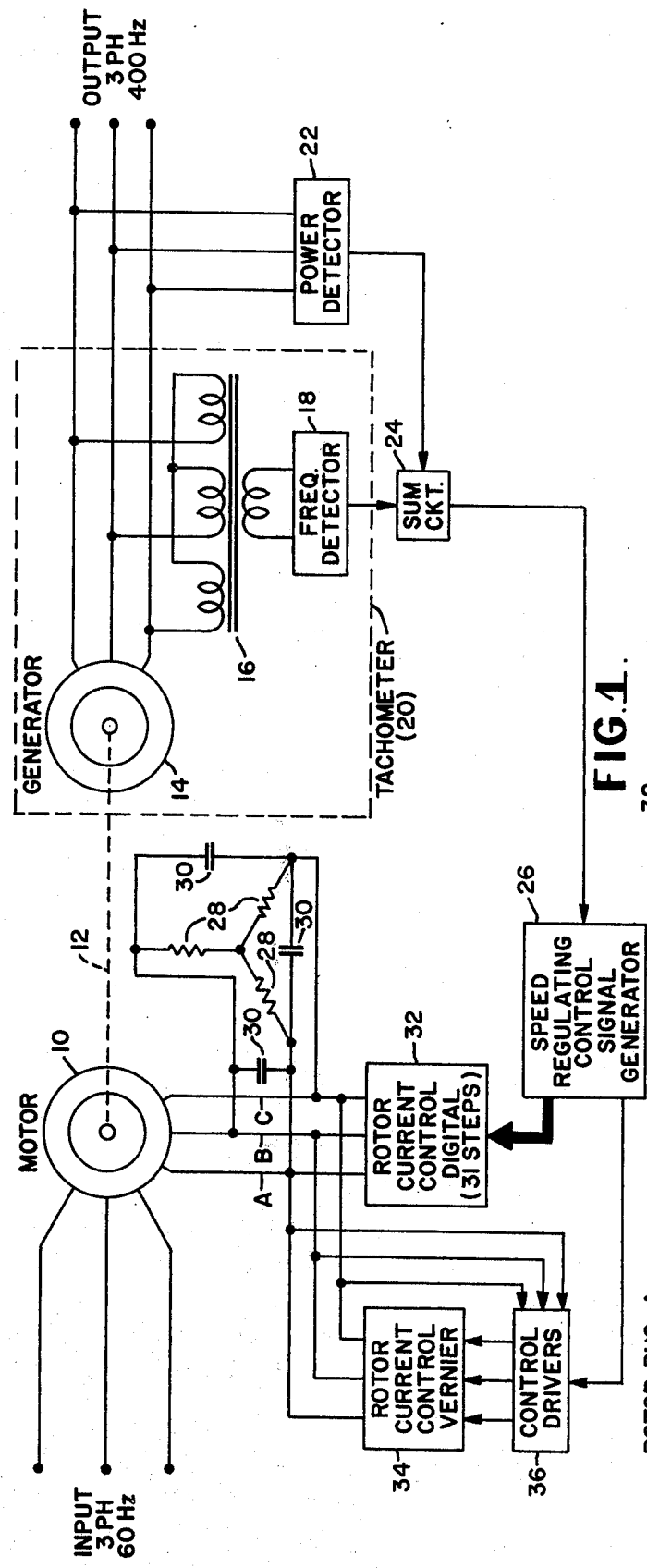
FIG. 1 is a schematic diagram, partially in block form, illustrating a motor generator system embodying the invention.

Referring more particularly to FIG. 1, there is shown a three-phase wound rotor motor 10. This motor may suitably be a large induction motor, say of 300 horsepower rating. Input voltage which may for example be 440 volts, three phase at 60 Hz is applied to the stator windings of the motor. The rotor of the motor also has a three-phase rotor winding, each phase winding being connected by way of slip rings to a different rotor bus indicated as the A, B and C rotor buses. The shaft 12 of the motor 10 is connected to drive the rotor of a three-phase 400 Hz synchronous generator 14. The output of this generator may be for example 450 volts, three-phase 400 Hz power. The generator 14 may be a large machine having a 200 KW output power rating. The field exciting windings and circuitry may be typical of synchronous generators and are not shown to simplify the illustration. The stator output windings of the generator 14 are coupled by a transformer 16 to a frequency detector 18. The detector 18 provides error voltages $E_{fn}$ and another error voltage $E_{fl}$ and is described more fully in connection with FIG. 4. These error voltages are a function of the output frequency of the generator 14 which corresponds to the speed of the motor 10 (viz, the speed of rotation of the motor shaft 12). Accordingly, the generator 14 together with the frequency detector 18 constitute a tachometer 20.

A power detector 22 is connected to the output lines of the generator 14. This connection may be by way of current transformers if desired. In the event that the real power component of the output increases or decreases (the power factor changes) the power detector will provide an output level to a summing circuit 24. There is thereby provided from the circuit 24 a composite error voltage which is used to control the speed of the motor so as to provide speed changes to accommodate changes in power factor. The power detector 22 is especially desirable for use where additional power output is obtained by paralleling another motor generator set with the motor generator set illustrated in FIG. 1 (parallel operation). In such event it is desired that both motor generator sets share the load equally. A power detector 22 is provided for each of the motor generator sets and detects conditions where load sharing differences occur so as to change the speed of the motor not fully sharing the load so that both motor generator sets take their equal share of the load during parallel operation.

The error signals produced by the frequency detector 18, including any additional error signal from the power detector 22, are applied to a speed regulating control signal generator 26. This generator produces two control signals. The first of these control signals is a multi-bit digital signal, while the second is a vernier analog control signal. The digital control signals are operative to control the speed of the motor in incremental steps in a range of motor speeds near the desired motor speed. This desired motor speed is the speed of the motor shaft 12 which results in a generator output frequency of 400 Hz. The vernier control signal provides smooth continuous speed control between each of the digitally controlled speed steps. The vernier control signal also is operative to control the speed of the motor in the range of the speed between stop and the digitally controlled speed range. In this low speed range, the vernier signal is operative to control the current through the rotor winding so as to provide for smooth low current start-up of the motor.

Motor current and the motor speed is controlled by controlling the resistance connected to the wound rotor of the motor 10. Wye-connected starting resistors 28 are connected to each of the rotor buses A, B and C. Capacitors 30 which are connected across the resistors 28 suppress transients. Suitably, the resistance of the starting resistors 28 are relatively high and limit the current in the wound rotor such that together with friction, windage and core losses, the motor speed is limited to about 20% below the range for controlled speed under No Load conditions where the digital control signals are operative. This control speed range is referred to herein as the near speed range. Rotor current in the near speed range is controlled by the digital current control 32 which affords 31 increments or steps in the rotor current under control of the digital signals. This digital current control 32 is illustrated in greater detail in FIG. 2.

A vernier rotor current control 34 synchronized to the rotor slip frequencies inserts a resistor during different portions of the cycle of the current which is introduced into the wound rotor. In other words, a vernier resistor is connected across the rotor phase winding for different portions of the phase of the induced rotor current. This current will be at the slip frequencies (the difference between the frequency of rotation of the rotating field established in the stator winding and the frequency of rotation (speed in rps) of the rotor of the motor 10). Such phase control of the rotor current is provided by control driver circuits 36, one for each of the windings of the rotor. The vernier control signals from the control signal generator 26 operates the control driver 36 so as to provide phase control of the effective vernier resistance in the vernier rotor current control 34 which is connected to the rotor winding. Thus the speed of the wound rotor motor 10 is controlled by varying the effective resistance in the motor rotor circuit. Resistors are effectively connected in series with the rotor winding. Decreasing the resistance thus causes an increase in rotor current thereby increasing motor speed, while increasing the resistance decreases the motor speed.

Figure 2:
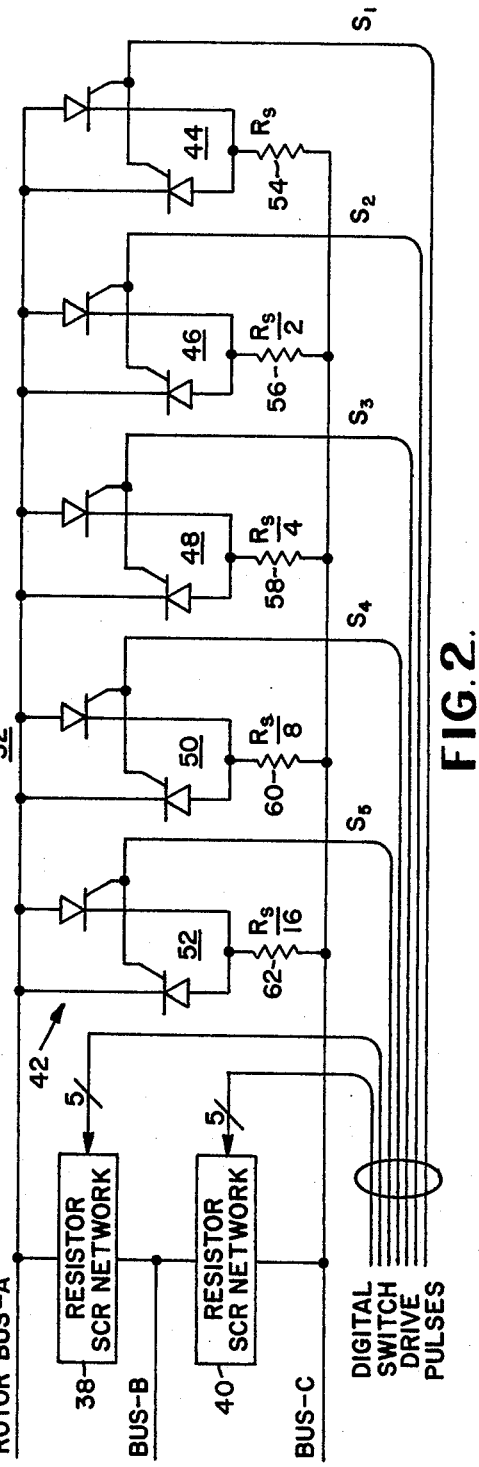
FIG. 2 is a schematic diagram illustrating the rotor current digital control of the system shown in FIG. 1.

The digital rotor current control 32 is illustrated in greater detail in FIG. 2. This control 32 provides 31 resistance steps and their corresponding 31 current steps. The 31 different fixed values of resistance are obtained by the switching of five resistors contained in resistor SCR networks 38, 40 and 42 which are connected in delta across the rotor phase windings (i.e. between the rotor buses). While a delta connection of the resistor SCR networks is shown, these networks may alternatively be connected in a wye arrangement. These resistor SCR networks are similar and only the network 42 which is connected between the A and B rotor buses is shown in detail. This network has five static switches 44, 46, 48, 50, and 52, each provided by a pair of SCR's and their associated triggering circuits. The SCR's are connected in polarity opposition so that current will flow to the switched resistors throughout the entire cycle of the voltage induced into the rotor. Each of the switches 44, 46, 48, 50 and 52 has a different resistor 54, 56, 58, 60 and 62, connected in series therewith. The values resistance of these resistors are binarily related. The highest valued resistor 54 having a value $R_s$ which is equal to the value of the starting resistor 28 (FIG. 1). In this manner, by triggering the switches with digital signals $S_1$ tp $S_5$, each representing the bit of a binary number corresponding in value to the resistor which it switches into and out of the circuit, thirty-one resistance steps are obtained by the digital rotor current control 32. If the digital signals $S_1$ to $S_5$ all represent binary zeros (viz. are all of reference, say ground, voltage level), only the starting resistor appears across the rotor windings. In total therefore, 32 resistance steps are available through the use of the digital rotor control 32. The digital switch drive pulses $S_1$ to $S_5$ are applied to the gates of the SCR's in the switches 44 to 52, desirably after amplification and conditioning (shaping) in conventional gate drive amplifiers (not shown).

The vernier rotor control 34 (see FIG. 3) contains an SCR switch circuit having three SCR's 64, 66 and 68, which are connected to the A, B and C rotor buses, respectively. The switches also include diodes 70, 72 and 74 which are connected in series therewith. A vernier resistor 76 having the value $R_v$ which is equal to the value $R_s$ of the starting resistor 28 (FIG. 1) is connected in parallel across each SCR diode series circuit. A single vernier resistor 76, rather than separate vernier resistors may therefore be used in accordance with a feature of the invention for vernier current control purposes. The SCR's 64, 66 and 68 are triggered by pulses $G_A$, $G_B$ and $G_C$ which are obtained from the control driver 36. The drive pulses $G_A$, as will be explained more fully hereinafter in connection with the description of the control driver 36 which is shown in FIG. 6 are synchronous with the phase A winding of the rotor of the motor 10. The control pulses $G_B$ and $G_C$ are synchronous respectively with the voltage induced in the phase B and phase C rotor windings.

When a $G_A$ pulse triggers the SCR 64, the vernier resistor 76 is connected via the SCR 64 and the diodes 72 across the A phase winding of the rotor which is connected between rotor bus A and rotor bus B. The diode 70 is then biased out of the circuit since a positive potential is connected to the cathode thereof, when the SCR 64 conducts. The vernier resistor 76 will similarly be connected across the B and C rotor windings by way of the SCR's 66 and 68 through the other diodes 74 and 70 when the $G_B$ and $G_C$ pulses from the control driver are applied thereto. The SCR's 64, 66 and 68 are phase controlled to conduct during the period in the cycle of the voltage induced in the rotor phase windings after which they are triggered. Thus the interval during which current can flow through the vernier resistor can be smoothly controlled, thus effectively providing a continuous range of vernier resistance from an infinite value of resistance to the value $R_V$. Inasmuch as the value of the vernier resistance $R_V$ is equal to the highest value resistor of the resistors 54 to 62 (FIG. 2) the vernier resistor enables the vernier control 34 to provide smooth current variations between each of the 31 current steps controlled by the switches 44 to 52 in the digital current control 32. When the vernier resistor 76 is connected across a resistor SCR network 38, 40 or 42 (FIG. 2), the total resistance connected across a rotor winding will correspond to the next highest binary number represented by the binary code $S_5$, $S_4$, $S_3$, $S_2$, $S_1$. When the vernier resistor 74 is effectively disconnected (the infinite resistance case) the value of resistance will correspond to the binary code number. As the effective value of the vernier resistance is increased by $R_V$ the range between each successive step is covered, thus the vernier rotor current control provides infinite current control. As the vernier resistor is switched out at the beginning of each successive step and then is gradually switched in during increasing portions of the cycle of the rotor voltage, the rotor current gradually increases so as to provide stepless smooth current control.

Figure 4:
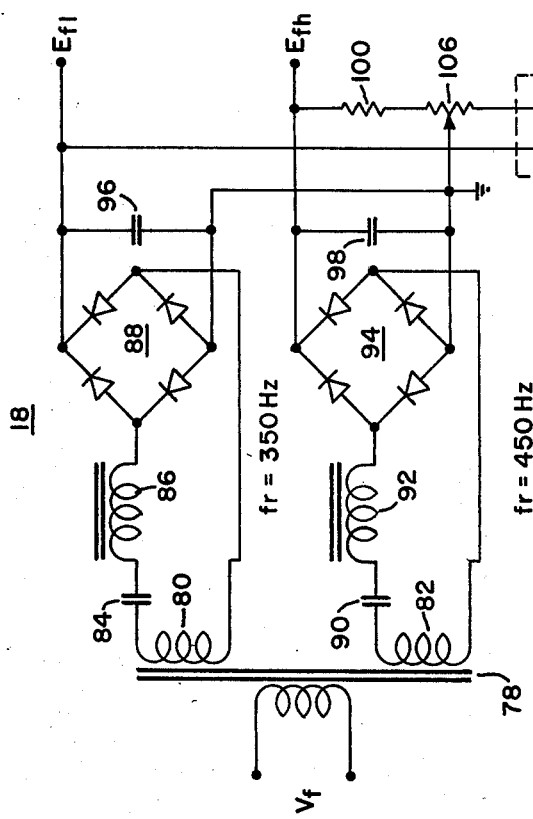
FIG. 4 is a schematic diagram illustrating the frequency detector circuit of the system shown in FIG. 1.

The frequency detector 18 is shown in detail in FIG. 4. The voltage tapped from the generator output lines is applied to a transformer 78 having two secondary windings 80 and 82. The winding 80 is connected through a series circuit made up of a capacitor 84 and an inductor 86 across a full wave bridge recitifier 88. The capacitor 84 and inductor 86 constitute a series resonant circuit tuned to a frequency below the frequency at which the generator provides its desired output frequency (400 Hz) and the motor 10 is operating at desired speed. This frequency is a set number of cycles below the output frequency and may suitably be 350 Hz.

The other secondary winding 82 is connected to a series circuit including a capacitor 90 and an inductor 92. Another bridge rectifier 94 is connected in series with the secondary winding 82 and the circuit consisting of the capacitor 90 and inductor 92. The capacitor 90 and inductor 92 define a circuit which is in series resonant at the same number of cycles above the desired output frequency from the generator as the circuit consisting of the capacitor 84 and inductor 86 is below the desired output frequency. This higher resonant frequency may suitably be 450 Hz. A direct current voltage which varies in accordance with the frequency of the generator output voltage is obtained across each of the bridge rectifiers 88 and 94 and is filtered by filter capacitors 96 and 98.

Connected across the bridge rectifier 88 is the summing circuit 24 which consists of a pair of resistors 102 and 104 and a portion of a potentiometer 106 between one end of the movable tap thereof which is connected to ground along with the negative polarity side of the rectifier bridge 88. The bridge 94 which is connected to the high frequency resonant circuit, 92 of the detector 18 has connected across it a portion of the potentiometer 106 and a resistor 100 which is approximately the same value as the sum of the values of resistors 102 and 104. The resistor 104 is much smaller than the resistor 102 in value. The detector provides high side output voltages $E_{fh}$ and $E_{fl}$ which appear between ground and the resistor potentiometer circuits connected across the bridge rectifiers 88 and 94. The difference between these error voltages $E_{fl}$ and $E_{fh}$ is obtained by connecting the voltages in bucking relationship. To this end a difference amplifier stage is used. This stage is provided by the stage 138 of an operational amplifier of the error amplifier unit 108 in the control signal generator 26 which will be discussed hereinafter in connection with FIG. 5. Alternatively another potentiometer may be connected between the junction of the resistor 100 and the capacitor 98 and the resistor 102 and the capacitor 96 and the difference voltage obtained across that resistor. The use of a difference amplifier stage is preferred. The power detector output is applied across the resistor 104 and is added to the high side error voltage to provide a composite high side error voltage $E_{fh}$. In the event that parallel load sharing is not used, the input from the power detector is disconnected from the summing circuit 24.

Figure 5A:
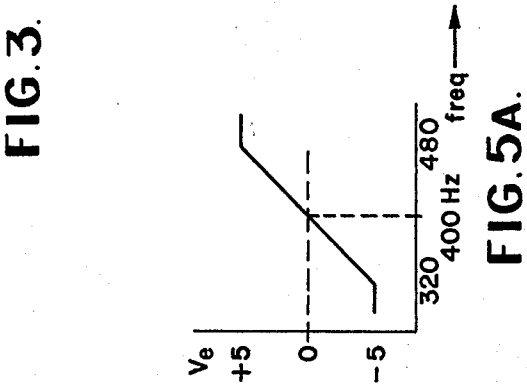
FIG. 5A is a graph showing the control characteristic of the frequency detector circuit shown in FIG. 4.
Figure 5:
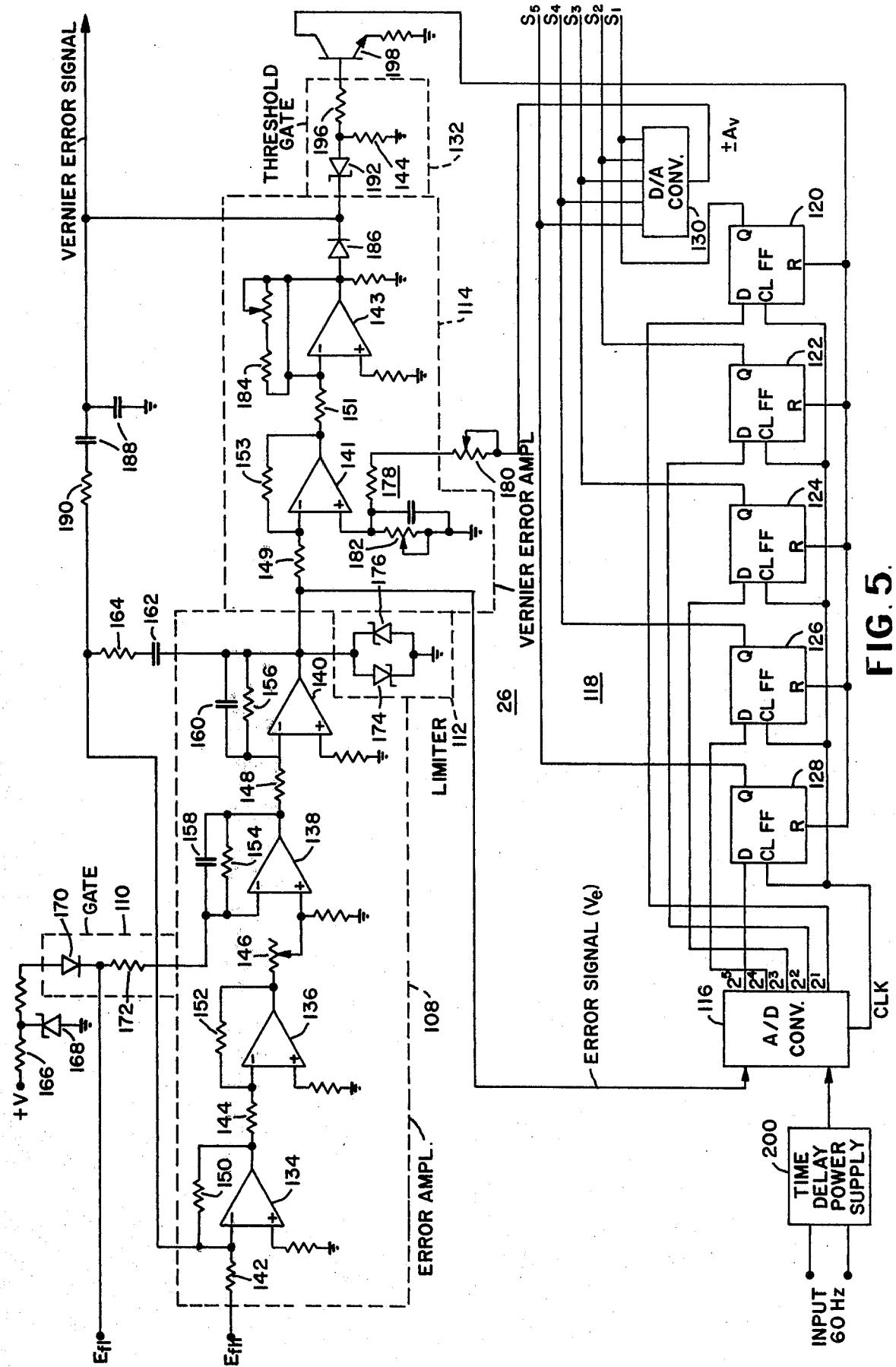
FIG. 5 is a schematic diagram, also partially in block form, illustrating the speed regulating control signal generator of the system shown in FIG. 1.

The error signals $E_{fh}$ and $E_{fl}$ are used in the control signal generator 26, which is shown in FIG. 5, in order to generate control signals which operate the rotor current controls 32 and 34. As shown in FIG. 5, the control signal generator 26 contains an error amplifier 108 to which the $E_{fh}$ and $E_{fl}$ error signals are applied. The $E_{fl}$ error signal also controls the operation of the error amplifier 108 by operating a threshold gate 110. A limiter circuit 112 is connected across the output of the error amplifier 108. The error amplifier 108 also drives a vernier error amplifier 114 by applying an error signal $V_e$ thereto. This error signal is also applied to an analog to digital converter 116 which produces output digital signals in accordance with a binary code. Five such signals respectively, representing the $2^1$, $2^2$, $2^3$, $2^4$ and $2^5$ bits of a binary coded digital signal are stored in a memory 118 made up of five flip-flops 120, 122, 124, 126 and 128. The digital signal stored in these flip-flops are used as the signals $S_1$, $S_2$, $S_3$, $S_4$ and $S_5$. The digital signals $S_1$, $S_2$, $S_3$, $S_4$ and $S_5$ may be amplified in buffer amplifiers or other gate drive circuits and applied to the gate electrodes of the silicon control rectifiers in the switches 44, 46, 48, 50 and 52 of the digital rotor current control (FIG. 2).

A digital to analog converter 130 provides an analog output voltage indicated as $\pm A_V$ which is applied to the vernier error amplifier. The vernier error signal from the output of the amplifier 114 is also applied to a threshold gate circuit 132 and when a certain threshold is exceeded, which occurs when the speed of the motor 10 is between stop and its normal speed range, an inhibit signal is passed by the gate and serves to reset the flip-flops in the memory 118 thus inhibiting the digital signals $S_1$ to $S_5$ (i.e. they are each reset to "0").

The error amplifier 108 as well as the vernier error amplifier are provided by cascade connected operational amplifier stages 134, 136, 138, 140, 141 and 143. These stages have direct and inverting inputs indicated respectively by the + and − signs thereon. The high frequency detector output voltage $E_{fh}$ is applied to the input of the stage 134, which together with the stage 136, provides a non-inverting unity gain amplifier. The gain of these amplifier stages is set by their input resistors 142 and 144 and their feedback resistors 150 and 152. The output of the unity gain amplifier stages is applied by way of a potentiometer 146, which serves for balance adjusting purposes, to the amplifier stage 138 which operates as a difference amplifier.

The low frequency error voltage $E_{fl}$ from the detector is applied to the inverting input of the amplifier 138 through a resistor 172. The gain of the stage 138 is determined by the resistance presented by the potentiometer 146 and the stage feedback resistor 154. A capacitor 158 serves to filter out any ripple in the voltages developed by the frequency detector. The output of the amplifier stage 138 will then be a voltage which is of zero amplitude when the generator 14 output voltage $V_f$ is at 400 Hz. The amplifier stage 140 inverts this error voltage from the difference amplifier stage 138 and also amplifies this voltage; the gain of the stage 140 being suitably about 10 and being set by the values of the input resistor 148 and the feedback resistor 156 of the stage 140. A ripple filter capacitor 160 is also connected across the feedback resistor 156.

The entire error amplifier 108 is stabilized by a feedback path including a capacitor 162 and a resistor 164, which may be a variable resistor, which are connected between the output of the last stage 140 and the input of the first stage 134 thereof. It will be observed that this feedback path provides negative feedback to the input of the amplifier. The limiter 112 clips the error signal when it exceeds certain amplitude, either positive or negative as illustrated in FIG. 5A. The limiter 112 has two zener diodes 174 and 176 which are connected in polarity opposition. The clipping level may suitably be 5 volts which is the zener voltage of the diodes 174 and 176. In the normal speed range therefore, the error signal $V_e$ varies between plus and minus 5 volts as the motor covers a range of approximately 20% of each side of desired motor speed which, as indicated, may correspond to a frequency range from 320 to 480 Hz.

Operating power for the amplifier stages may be provided from a source of operating voltages indicated as +V which may be a power supply connected to the input three-phase 60Hz power line. The connection of this source to the amplifier stages is not shown to simplify the illustration.

A source of constant voltage is provided from the +V supply by means of a resistor 166 and a zener diode 168 and is equal to the breakdown voltage across the zener diode 168. This voltage is lower than the voltage $E_{fl}$ across the low frequency branch rectifier 88 of the frequency detector 18 when the speed of the motor 10 exceeds 80% of desired speed. In such case, the generator frequency will be above about 320 Hz which may correspond to an $E_{fl}$ voltage of about 7 volts. The gate 110 is provided by a blocking diode 170 and the resistor 172 which connects the $E_{fl}$ output voltage of the frequency detector to the inverting input of the amplifier stage 138. Accordingly, when the error voltage $E_{fl}$ drops below 7 volts the voltage across the diode 168 will be applied to the inverting input of the amplifier stage 138. The high frequency output voltage $E_{fh}$ then is absent when the motor is below its normal speed range. The amplifier stage 140 under such conditions develops a positive voltage above the upper clipping level of the limiter 112 which is provided at the output of the error amplifier 108 as the error signal $V_e$. As soon as the motor comes up to 80% of speed, the low end error voltage $E_{fl}$ exceeds the voltage across the zener diode 168 and causes the diode 170 to block, thus opening the gate 110. When the motor is below the normal speed range (i.e. between stop and a speed which produces a generator output voltage $V_f$ of frequency below 320 Hz) the gate 110 opens and the voltage at the output of the last stage 140 of the error amplifier rises above the positive clipping level established by the diode 176 and the limiter 112. Thus, until the motor reaches the near speed range, the error signal $V_e$ will be at its maximum positive amplitude.

The vernier error amplifier 114 utilizes the first stage thereof 141 as a difference amplifier so as to derive the difference between the error signal $V_e$ and the digital to analog converter output voltage $A_v$. The voltage $A_v$ is applied to the direct input of the amplifier stage 141 through a resistor capacitor network 178, including the potentiometers 180 in series and 182 in shunt with the direct input for level adjustment purposes. The input resistor 149 and the feedback resistor 153 of the operational amplifier stage 140 are desirably selected so that the stage 141 has finite gain, say of 10. The input resistor 151 and the feedback resistors 184, one of which may be a potentiometer for vernier gain adjustment purposes, are adjusted so that the stage 143 has sufficient gain to provide a vernier error signal of sufficient amplitude to drive the control drivers 36. The amplifier stage 143 may, in the event that the stage 142 has sufficient gain, have approximately unity gain.

A diode 186 connects the output of the stage 143 in negative feedback relation to the input of the stage 141 through a rate feedback circuit which includes the capacitor resistor network 162 and 164 and another circuit including capacitors 188 and a resistor 190. In the event that the vernier error signal increases rapidly in magnitude as when the motor speed increases abruptly or decreases abruptly, such that the gate 110 closes to apply the constant voltage across the zener diode 168 to the input of the amplifier stage 138, the capacitors 188 charge and present a voltage at the cathode of the diode 186 which causes the diode to block the rate feedback path. The vernier error amplifier is then permitted to follow error signals resulting in rapid increases or rapid decreases in motor speed.

If desired, other circuits which may for example be responsive to other changes in generator output conditions such as short or open circuits may be connected to the vernier error signal output line so as to modify the vernier error signals to cause the motor's speed to increase or decrease in a manner to compensate for such changes.

The threshold gate 132 includes another zener diode 192 which is connected by way of a resistor 194 across the output of the vernier amplifier 114. Another resistor 196 connects the base of a transistor 198 to the zener diode 192. The zener diode 192 may have a zener breakdown voltage of a certain level, for example 6 volts, to which the vernier error signal rises when the motor speed drops below the near speed range, as is the case during the motor starting cycle. When this threshold is exceeded, a transistor 198 is switched on and connects ground to the reset input of the flip-flops 120 to 128 in the memory 118 causing all of the flip-flops to be reset. The digital signal is then inhibited such that all of the bit signals $S_1$ to $S_5$ drop to a level such as ground representing binary zero bits. Only when the motor reaches the normal speed range and the vernier error signal drops below the threshold set by the zener diode 192 is the transistor 198 switched off and the reset or inhibit level removed. Thereafter the vernier error signal which is generated drops to that level to provide the vernier control which varies rotor current smoothly between the current steps established by the digital control signals $S_1$ to $S_5$.

The power to the analog to digital converter is supplied from the input 60Hz lines which are connected to the motor stator winding from a time delay power supply 200. The time delay may be afforded by a charging circuit in the alternating current to direct current converter circuits of the supply 200. Accordingly, the analog to digital converter does not receive operating voltage immediately upon turn-on of the motor generator set and the digital control signals remain at their binary zero values; thus insuring that the digital rotor current control switches (e.g. 44 to 52, FIG. 2) remain open, thus limiting rotor current to relatively low values determined by the starting resistor 28 and the vernier resistor 76 of value $R_v$ until the motor can come somewhat up to speed. The time delay power supplies 200 thus provides additional assurance that starting current will be limited to low values.

In operation, the analog to digital converter 116 provides a binary signal corresponding to the decimal number 16, which is mid-point in the range of the numbers to which the digital signal which can be produced by the analog to digital converter 116, corresponds. Accordingly, when the vernier error signal is about zero amplitude level, the digital signal from the analog converter corresponds to the decimal number 16. Under this exemplary condition, the $S_4$ bit will be of high level representing a binary "1" while the remaining bits $S_1$, $S_2$, $S_3$ and $S_5$ will be of low level representing binary "0". These bits are obtained at the Q outputs of the flip-flops 120 to 128. The analog-to-digital converter digital outputs are applied to the D inputs of the flip-flops. The analog to digital converter 116 includes an internal clock which provides signals internally of the converter for sampling the error signal at regular intervals, say each millisecond. This clock also is applied to the clock input of the flip-flop such that the bits presented to the D inputs are stored in the flip-flop. The memory 118 is updated every clock pulse period, say every millisecond. The digital signal corresponds to the error signal such that when the error signal is at the low end of its range, e.g. −5 volts as determined by the limiter, the digital signal produced by the converter will be all zeros, i.e. $2^1$, $2^2$, $2^3$, $2^4$, and $2^5$ output bit signals from the converter 116 are all binary "0". At the upper end of the range these bit signals provided by the converter 116 will all be binary "1". As mentioned above, the binary signal corresponding to an error signal of zero volts (which is produced when the motor is at the desired operating speed) is at the mid point of the range and may suitably be the binary number corresponding to decimal 16. In other words, only the $S_4$ bit signal will represent a binary "1" while the other bit signals $S_1$, $S_3$ and $S_5$ will be binary "0". The digital to analog converter 130 provides an analog voltage $A_v$ which is also substantially zero when the digital signal is in the mid point of its range and increases in amplitude in the positive sense ($+A_v$) in the digital signal value above the value corresponding to decimal 16 and in the negative sense ($-A_v$) when the digital signal drops below the value corresponding to decimal 16. For each digital signal value there is a range through which the vernier error signal varies, until the next digital value is reached. This range may be from zero to 6 volts which is the threshold established by the gate 132. As indicated above, this vernier error signal changes the effective vernier resistance 76 ($R_v$, see FIG. 3) which is connected to the motor winding and thus provides smooth control between each digital step.

Figure 3:
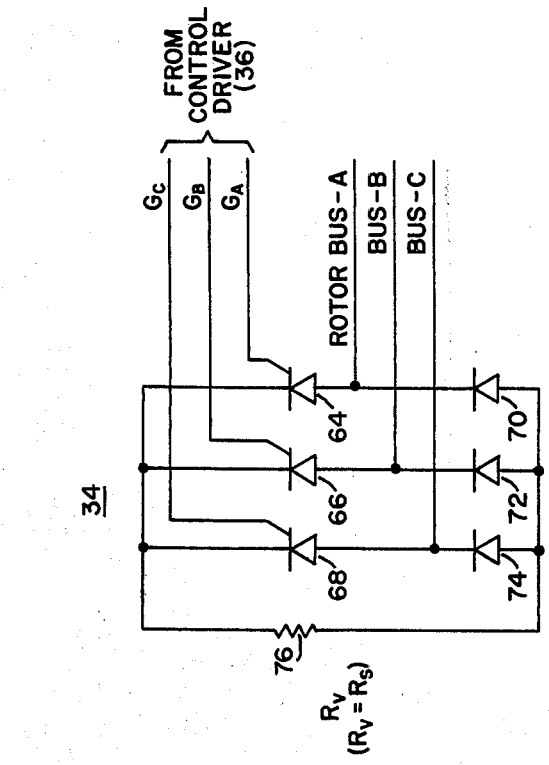
FIG. 3 is a schematic diagram illustrating the rotor current vernier control of the system shown in FIG. 1.

The digital to analog converter 130 output voltage $A_v$ corresponding to the highest value digital signal (the value corresponding to decimal 31) is adjusted such that it is several volts less than the maximum vernier error signal amplitude $V_e$ established by the limiter 112. Accordingly, during the starting cycle and when the motor drops below the normal speed range, the vernier error signal will rise above the threshold established by the gate 132 such that the transistor 198 will be switched on and inhibit the digital signal $S_1$ to $S_5$. Control during starting is then by means of the vernier error signal and all of the switches 44 to 52 in the digital current control 32 (FIG. 2) are open. Current is then controlled only by the starting resistor 28 and the vernier resistor 76 (FIG. 3).

Three control driver circuits 36, one for each phase of the three-phase motor winding are provided. Since these circuits 36 are similar, only the circuit which is provided for the A winding, and which is connected between the A and B rotor buses is shown in FIG. 6. The inputs to this circuit are the vernier error signal which is applied to a transistor amplifier stage 202 which is connected to the input of a synchronized pulse generator 204. The pulses generated by the generator 204 are amplified in a pulse amplifier 206 and coupled via a pulse transformer 208 to the gate electrode of the SCR 64 in the vernier current control circuit 34. The other SCR's 66 and 68 are triggered by control drivers for the B and C phase winding of the motor rotor respectively. A diode 210 connected across the secondary of the pulse transformer 208 suppresses any negative going excursions of the pulses produced by the generator 204. A resistor capacitor circuit 212 suppresses transients in the pulse signal which is applied between the gate and anode of the SCR 64.

The other input to the control driver is the voltage induced in the phase A rotor winding. This voltage will be at the slip frequency and vary from 60 Hz on locked rotor conditions to zero Hz when the motor is at desired operating speed. The rotor buses are connected to a coupling transformer 214, the secondary of which is connected to a filter 216 tuned to pass only the slip frequency range. This filter includes a resistor 218, an inductor 220 and a capacitor 222. The filter is connected to a squaring and clipping circuit 224. This circuit contains a pair of cascade connected operational amplifiers 222 and 228. The output of the amplifiers 28 is clipped by a diode 230 so as to provide a train of pulses, each having a duration equal to one-half cycle (180° of phase) of the slip frequency voltage induced in the rotor of the motor 10.

The square wave output is applied to the collector of the transistor 202 which amplifies the vernier error signal and to the emitter of another transistor 232 in the pulse generator 204. The collector of this transistor 232 is connected by way of a capacitor 236 to the return line 234 which is common to the squaring circuit 224 and the pulse generator 204. As the vernier error signal increases, the rate at which the capacitor 236 can charge to the maximum amplitude of the square wave voltage from the squaring circuit 224 also increases. In other words, increasing vernier signal amplitude decreases the resistance in the charging circuit to the capacitor 236 by effectively increasing the conductance of the emitter to collector path of the transistor 232. The gate electrode of a uni-junction transistor 238 is connected to the capacitor. The uni-junction transistor is connected across the operating voltage source indicated at +V to resistors 240 and 242 which are connected to its source and drain electrodes. When the triggering potential of the uni-junction transistor is reached, the uni-junction fires and current flows through the resistor 242. This current produces a voltage of increasing amplitude which is amplified in the amplifier 206 and is outputted in the form of a pulse by the pulse transformer 208. The negative excursion of this pulse is clipped by the diode 210 such that a positive pulse is generated which will trigger the SCR 64.

A discharge circuit 224 may be used in the event that it is desired to have the capacitor 236 fully discharged after each pulse. The capacitor will discharge almost completely however, through the gate to drain path of the uni-junction transistor 238. Accordingly, the discharge circuit may be dispensed with if desired. The discharge circuit includes two transistors 246 and 248 which are normally biased to cut off by the square wave voltage from the circuit 224 and the negative terminal of the operating potential source indicated at −V. The leading edge of the voltage which appears across the resistor 242 when the uni-junction 238 fires as well as the negative-going trailing edge of the square wave from the circuit 224 both produce conduction in the transistor 248 which insures the discharge of the capacitor 236 either after the pulse is produced or at the end of the slip frequency voltage half cycle.

Figure 6A:
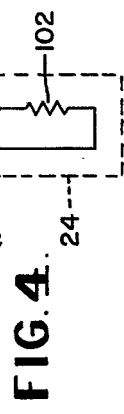
FIG. 6A is a curve illustrating the operation of the control driver circuits shown in FIG. 6.
Figure 6A:
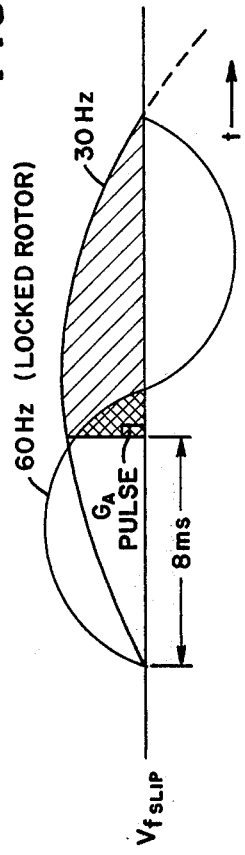
Figure 6:
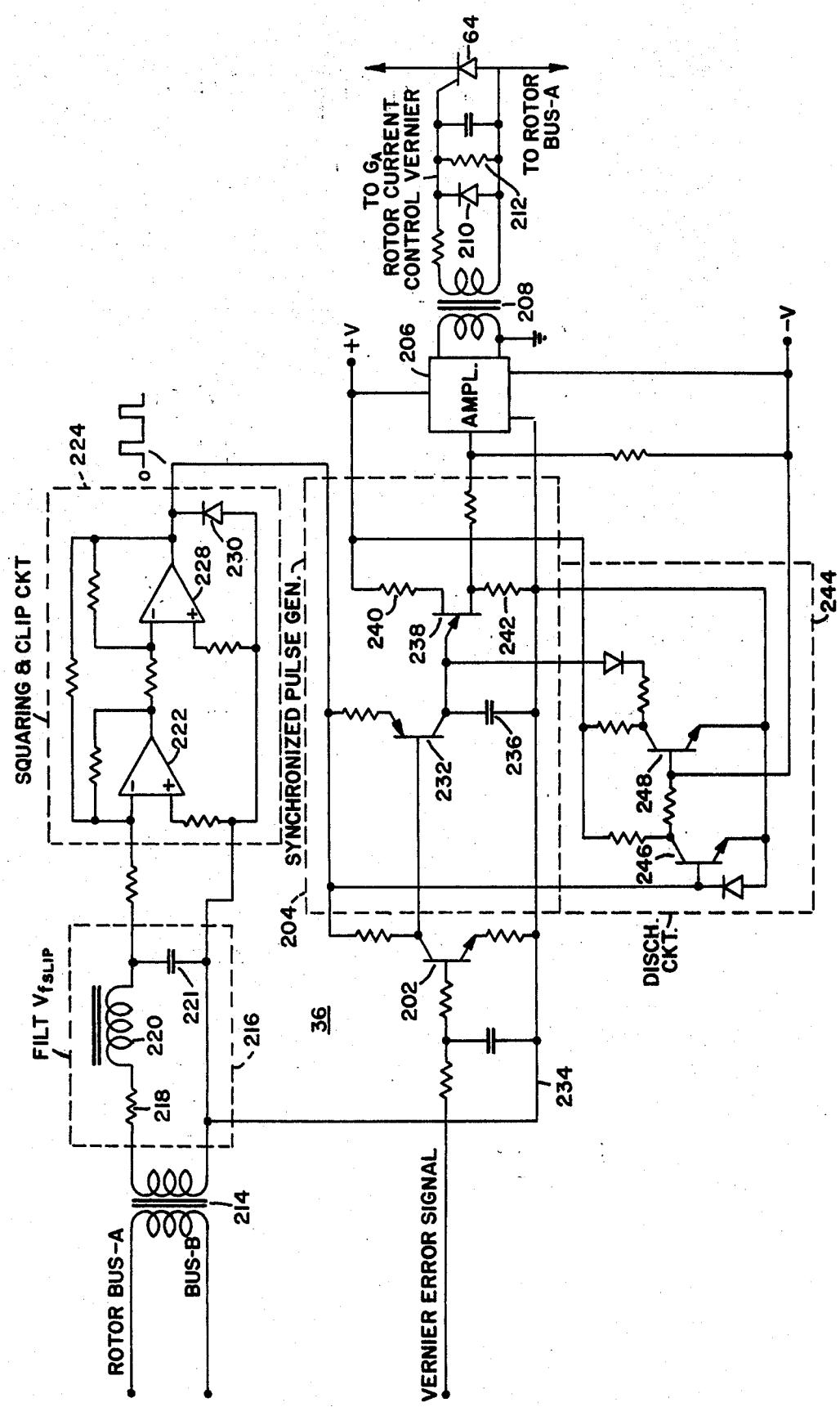
FIG. 6 is a schematic diagram also partially in block form illustrating one of the vernier control driver circuits of the system shown in FIG. 1.

FIG. 6A illustrates the slip frequency voltage waveform for two conditions, namely when the slip frequency voltage has a frequency of 60 Hz during locked rotor conditions and when the motor is coming up to speed and slip frequency has reduced to 30 Hz. It will be assumed that the vernier error signal amplitude is the same for both cases. Since the square wave starts at the beginning of each half cycle (at zero degrees of phase due to the action of the squaring circuit 224), the capacitor 236 charges to the uni-junction 238 triggering potential in the same time interval which is indicated as being 8ms. The trigger pulse $G_A$ is then produced. It will be noted that this trigger pulse is able to turn on the SCR 64 for only a limited portion of the cycle in the locked rotor case while the SCR is on for almost 100° of the cycle in the 30 Hz case. Accordingly, the vernier resistor is connected to the phase A winding for a longer period as the motor comes up to speed. It will be apparent therefore that the resistance $R_v$ connected to the rotor winding effectively decreases in value as the motor comes up to speed. In other words, an increase in the time during which current may flow (which occurs only when $R_v$ is connected to the rotor winding) increases as the slip frequency decreases. The rotor current and therefore the current drawn by the motor thus is limited and permitted to increase gradually to bring the motor up to speed.

From the foregoing description it will be apparent that there has been provided an improved system for regulating the speed of and current drawn by a wound rotor motor. While the system has been illustrated as embodied in a motor generator set including a wound rotor motor, it will be appreciated that other electrical machinery including wound rotor motors may utilize the invention and that modifications within the scope of the invention will also become apparent to those skilled in the art. Accordingly, the foregoing description should be taken merely as illustrative and not in any limiting sense.

What is claimed is:

1. A system for controlling the speed of an A.C. electric motor having a wound rotor comprising
   a. means responsive to the speed of said motor for providing an output signal which deviates from a certain value correspondingly with deviations in the speed of said motor from a given speed, b. control signal generator means responsive to said output signal for providing first and second control signals, corresponding to deviations of said output signal of larger value and of smaller value respectively, said second control signal also corresponding to output signal values for low motor speeds produced during starting and the like,
c. means for controlling the rotor current in said motor in accordance with said first and second signals, and
d. means included in said control signal generator means for converting said first signal into a multibit digital signal, said converting means including an analog to digital converter responsive to said first signal for converting said first signal into said digital signal, and
e. means responsive to said first signal and a level representing the analog value of said digital signal for providing as said second signal a signal corresponding to the difference therebetween.

2. The invention as set forth in claim 1 further including a digital to analog converter for converting said digital signal into said level.

3. The invention as set forth in claim 1 including means responsive to said second signal for inhibiting the provision of said digital signal when said first signal reaches a value corresponding to speeds less than a certain speed below said given speed whereby to provide only said second signal for controlling the speed of said motor.

4. The invention as set forth in claim 3 further including means for providing said analog value of said digital signal so that the highest value thereof is less than said value of said first signal corresponding to speeds less than said certain speed whereby said second signal which results when said first signal is of said last named value then operates said inhibiting means.

5. A system for controlling the speed of an A.C. electric motor having a wound rotor comprising
a. means responsive to the speed of said motor for providing an output signal which deviates from a certain value correspondingly with deviations in the speed of said motor from a given speed,
b. control signal generator means responsive to said output signal for providing first and second control signals, corresponding to deviations of said output signal of larger value and of smaller value respectively, said second control signal also corresponding to output signal values for low motor speeds produced during starting and the like,
c. means for controlling the rotor current in said motor in accordance with said first and second signals, and
d. said speed responsive means including an A.C. generator driven by said motor for providing a signal having a frequency which corresponds to the speed of said motor, and frequency detector means responsive to said generator signal including first and second circuits respectively tuned to frequencies above and below the frequency of the signal produced by said generator when said motor is running at said given speed, and circuit means connected to said first and second circuits for providing as said output signal the difference in the magnitude of the signals provided by said first and second circuits.

6. The invention as set forth in claim 5, wherein said first and second tuned circuits are each series resonant tuned circuits, and said circuit means includes rectifier circuits connected to said circuits, and circuit means connected to said rectifiers for obtaining the difference in the voltage across said rectifiers to provide said output signal.

7. The invention as set forth in claim 5 further comprising a source of voltage, a threshold gate circuit responsive to the voltage produced by the one of said rectifier circuits connected to the one of said tuned circuits which is tuned to the lower frequency for gating to an output of said threshold gate circuit the voltage from said source when said one rectifier circuit voltage drops below a certain threshold value corresponding to speeds of said motor between stop and a certain low motor speed.

8. The invention as set forth in claim 7 further comprising means for combining said threshold gate output with said output signal to provide said first signal.

9. A system for controlling the speed of an A.C. electric motor having a wound rotor comprising
a. means responsive to the speed of said motor for providing an output signal which deviates from a certain value correspondingly with deviations in the speed of said motor from a given speed,
b. control signal generator means responsive to said output signal for providing first and second control signals, corresponding to deviations of said output signal of larger value and of smaller value respectively, said second control signal also corresponding to output signal values for low motor speeds produced during starting and the like,
c. means for controlling the rotor current in said motor in accordance with said first and second signals, and
d. said current controlling means comprising first means connected to said winding of said rotor for changing the resistance effectively across said winding in accordance with said first control signal, and second means also connected to the rotor winding for changing the resistance across said winding in accordance with said second control signal, and a resistor connected permanently across said winding having a resistance of sufficient value to at least equal the resistance presented by one of said first means and said second means.

10. The invention as set forth in claim 9 wherein said control signal generator means includes means for providing said first control signal as a digital signal having a plurality of bits, and said first means includes a plurality of parallel circuits each corresponding to a different bit of said digital signal and each including a switch device and a resistor in series, each of said last named resistors having a value related to the value of the bit of the digital signal to which it corresponds, and means for driving the switch device of each of said circuits with the digital signal bit corresponding thereto.

11. The invention as set forth in claim 10 wherein said motor is a polyphase motor having a plurality of rotor windings, a plurality of groups each containing said plurality of circuits, each group connected to a different one of said rotor windings.

12. The invention as set forth in claim 10 wherein said second means includes a resistor and phase controlled switching means operated by said second signal for connecting said resistor across said winding for different periods of each cycle of the voltage induced into said rotor winding the duration of which periods is controlled by said second signal.

13. The invention as set forth in claim 12 wherein said second means resistor and said permanent resistor have substantially the same resistance.

14. The invention as set forth in claim 10 wherein said second means includes a SCR and a resistor connected across said rotor winding, and means responsive to said second signal and to the voltage at the slip frequency which is induced into said rotor winding for providing said second signal as pulses synchronous with said slip frequency rotor voltage, and means for applying said pulses to trigger said SCR.

15. The invention as set forth in claim 10 wherein said motor is a polyphase motor having a polyphase rotor winding, and said second means comprises a plurality of SCR's each for a different one of the phases of aid rotor winding, a resistor, a plurality of diodes, a different one of said SCR's and a different one of said diodes being connected in series and polarized in the same direction, said resistor being connected in parallel with each of said series connected SCR's and diodes, said phases being connected each to a junction of a different one of said series connected SCR's and diodes, and means responsive to said second signal for triggering said SCR's.

16. For use with a wound rotor A.C. motor for controlling the speed thereof and limiting the starting current drawn by said motor, a regulating system which comprises
   a. means for providing a control signal which is a function of the speed of said motor,
   b. an error amplifier for amplifying said control signal,
   c. a vernier error amplifier for further amplifying said control signal and providing a vernier control signal,
   d. an analog to digital converter responsive to the output of said error amplifier for providing a multibit digital signal corresponding to said control signal,
   e. a digital to analog converter for converting said digital signal into an analog signal which varies in steps each step corresponding to a successive range of the amplitude of said control signal,
   f. means for applying said analog signal to said vernier error amplifier for conditioning said vernier error amplifier to provide vernier control signals which vary over an amplitude range corresponding to the amplitude range between each successive step of said control signal,
   g. threshold gate means connected to an output of said vernier error amplifier for inhibiting said digital signals and thereby said analog signals corresponding thereto when said control signals have an amplitude corresponding to motor speed between stop and a certain speed below desired motor speed,
   g. a plurality of current control resistors each corresponding to a different bit of said digital signal connected to said motor winding,
   i. at least one vernier current control resistor connected to said motor winding,
   j. means including a plurality of SCR's connected to said current control resistors and operated by said digital signals for varying the current through said rotor windings in steps, and
   k. vernier means including at least one SCR connected to said vernier control resistor for continuously varying the current through said rotor winding during the range of said motor speed between start up and said certain speed and between successive steps.

17. The invention as set forth in claim 16 wherein there are provided a plurality of flip-flops for storing said bits of said digital signal, said latches being input connected to said analog to digital converter and output connected to said digital to analog converter and means for connecting the output of said threshold means to the reset input of said flip-flops for resetting said fip-flops to zero, thereby inhibiting said digital signal.

18. The invention as set forth in claim 16 including a limiter circuit connected at the output of said control signal amplifier to limit said control signal to a range of signal amplitude corresponding to a high motor speed at one end of said range and a low motor speed at the opposite end of said range, said control amplitude at the opposite end of said range being sufficiently greater than the analog voltage provided by said analog to digital and digital to analog converter such that said vernier error signal exceeds the threshold of said threshold gate.

19. The invention as set forth in claim 18 wherein said control signal amplifier and said vernier signal amplifier comprise a plurality of cascade connected amplifier stages, one of said stages in said vernier amplifier being a difference amplifier and having said analog signal from said digital to analog converter applied thereto.

20. The invention as set forth in claim 19 wherein a feedback circuit is connected from the output to an input of at least one of said cascade connected amplifiers, said feedback path including a R-C circuit, and a gate diode connected between the output of said cascade connected amplifiers and said R-C circuit for blocking said feedback path when said vernier control signal increases in amplitude at greater than a certain rate.

21. The invention as set forth in claim 18 further comprising a source of voltage, a diode providing a threshold gate connected between said source of voltage and said control signal amplifier, means included in said control signal providing means and connected to said threshold gate diode for providing a control voltage for inhibiting said gate and preventing application of said source voltage to said amplifier unless said motor speed is below a certain value, said source voltage being of equal or exceeding said control signal amplitude at the opposite end of said range whereby to insure exceeding the threshold of said threshold gate which enables the inhibiting of said digital signal.

22. The invention as set forth in claim 16 including power supply means for said analog to digital converter for delaying the application of operating power thereto for a certain time interval upon turn-on of said system.

23. The invention as set forth in claim 16 wherein said vernier means for varying the current through said winding comprises a synchronous pulse generator for generating pulses for triggering said SCR of said vernier means, said pulse generator comprising
   an input filter circuit connected to said rotor windings and tuned to pass slip frequency signals induced in said rotor when said rotor speed differs from the synchronous speed of said motor.
   a squaring circuit connected to said filter for providing square wave signals corresponding to the signals passed by said filter, a capacitor, means responsive to said vernier control signal for controlling the flow of current from said square wave generator into said capacitor, and means for producing a pulse up said capacitor charging to a certain voltage.

24. The invention as set forth in claim 23 wherein said pulse producing means includes a uni-junction transistor having its gate electrode connected to said capacitor, and means responsive to the current flow through said uni-junction transistor for providing said pulse.

25. The invention as set forth in claim 23 wherein said vernier control signal responsive means includes a transistor having its collector to emitter path connected between the output of said squaring circuit and said capacitor, and means for applying said vernier control signal to the base of said transistor.

26. A speed regulated motor system which comprises
a. a wound rotor induction motor having a shaft,
b. means responsive to the speed of rotation of said shaft for providing a first signal responsive to deviation thereof from a certain shaft rotation speed,
c. means responsive to said first signal for generating second and third signals, said second signal representing relatively large changes in said first signal corresponding to relatively large shaft speed changes within a first speed range encompassing said certain speed, said third signal representing relatively small changes in said first signal corresponding to vernier changes in shaft speed and also representing large changes in said signal corresponding to shaft speeds below said range during the starting cycle of said motor,
d. means responsive to said second and third signals connected to the winding of said rotor for controlling the current in said rotor thereby regulating the speed of said motor.

27. The motor system according to claim 26 including an A.C. generator driven by said shaft and wherein said means for providing said first signal, includes frequency detector means responsive to the frequency of the A.C. produced by said generator.

28. The motor system as set forth in claim 27 further including means responsive to the power produced by said generator for generating a fourth signal corresponding thereto, and means for adding said fourth signal to said first signal and applying the sum of said first and fourth signal to said control signal generator.

* * * * *